April 30, 1935.      C. F. BURDETT ET AL      1,999,586
APPARATUS FOR CUTTING GLASS SHEETS
Original Filed Aug. 16, 1930      2 Sheets-Sheet 2
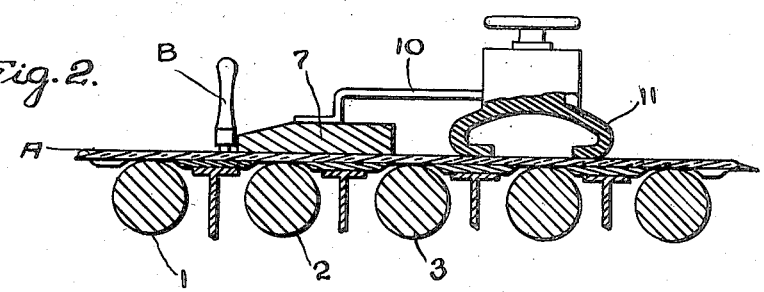
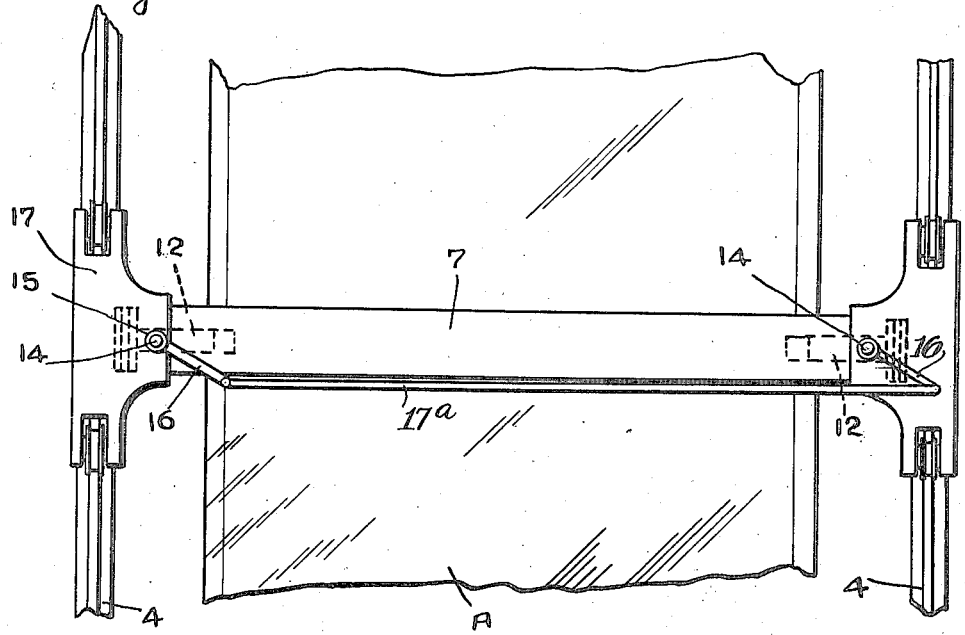
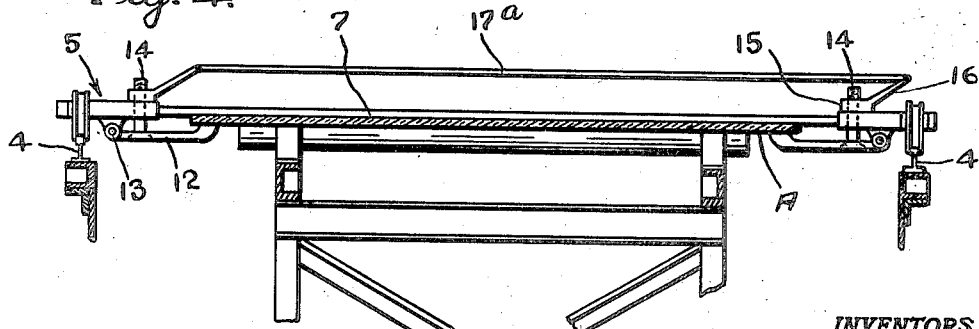
INVENTORS
CLARENCE F. BURDETT &
WM. OWEN.
BY Bradley & Bee
ATTORNEYS Patented Apr. 30, 1935

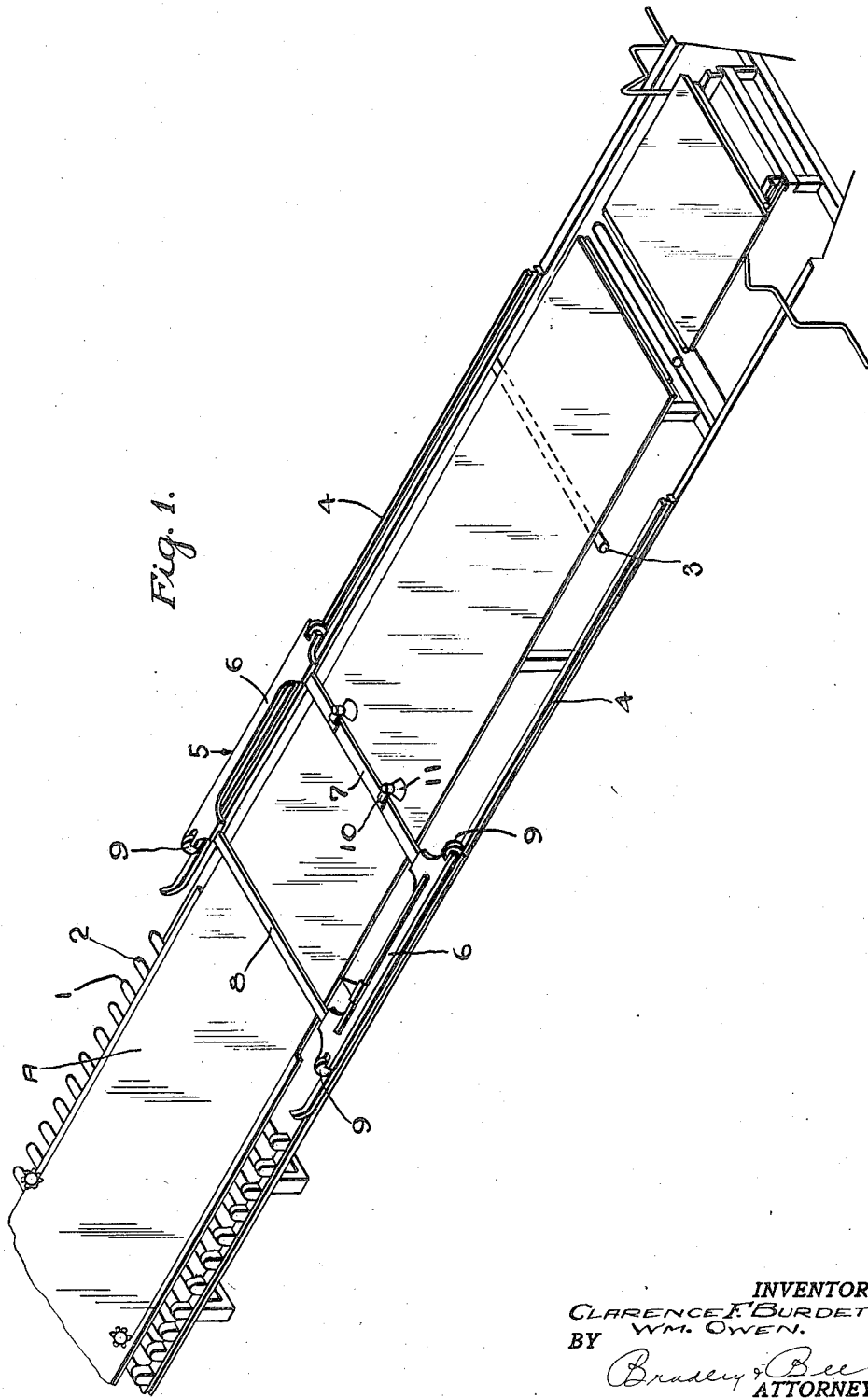

1,999,586

UNITED STATES PATENT OFFICE 1,999,586

APPARATUS FOR CUTTING GLASS SHEETS

Clarence Fredrick Burdett, Ford City, and William Owen, Pittsburgh, Pa., assignors to Pittsburgh Plate Glass Company, a corporation of Pennsylvania Original application August 16, 1930, Serial No. 475,788. Divided and this application January 4, 1933, Serial No. 650,092

2 Claims. (Cl. 33—32)

The invention relates to apparatus for cutting a glass sheet transversely, and the present application constitutes a division of our Patent No. 1,930,582. The glass sheet may be a continuous one formed from a tank, or it may be one formed by an intermittent casting operation, such as that made by the Showers process and apparatus set forth in Patents Nos. 1,603,989 and 1,579,666. The glass thus formed passes through a roller leer and out upon a roller runway, where the somewhat irregular side edges are trimmed off, and the sheet cut into lengths suitable for handling. The principal object of the invention is to provide an improved cross cutting frame wherein such frame is held securely in fixed relation to the moving sheet of glass during the cutting operation so that only one operator is required in order to make the cross cuts. Certain embodiments of the invention are illustrated in the accompanying drawings, wherein:

Figure 1 is a diagrammatic prospective view showing the runway at the outlet of a leer equipped with the improvements hereinafter described. Fig. 2 is an enlarged detail view in section. And Figs. 3 and 4 illustrate a modification, Fig. 3 being a plan view and Fig. 4 an end view particularly in section.

Referring to Fig. 1; 1, 2, 3, etc. are a series of rolls at the outlet end of a roller leer, such rolls constituting a runway upon which the glass sheet A is trimmed and cut transversely into sections as later described. Extending along the sides of the runway are a pair of rails 4, 4 on which is mounted the cross cutting frame 5 made up of the side members 6, 6 and the transverse members 7, 8, which act as straight edges in cutting the glass transversely. The frame 5 is provided with rollers 9 to permit it to move along with the glass during the cutting operation.

The glass may be cut by means of the usual hand tool B (Fig. 2) along the inner side of either of the straight edges 7 and 8, the operator standing upon the glass sheet in order to perform the cutting operation. The forward straight edge 7 is provided with a pair of brackets 10 carrying the vacuum cups 11 which are adapted to engage the surface of the glass sheet therebeneath and secure the straight edge to the glass, so that during the cutting operation, the frame will move along with the glass. If these clamping devices were not used, the necessary movement of the frame would have to be secured by another operator pressing down one of the straight edges so that it frictionally engaged the sheet and thus caused the frame to move with the glass. The use of the vacuum cups relieves the second operator of this duty and positively secures the frame to the glass during the cutting operation.

Figs. 3 and 4 of the drawings illustrate a modification in that other clamping means are substituted for the vacuum cups for securing the forward movement of the cutting frame with the glass. Aside from this means of attachment, the apparatus in this construction is similar to that of Fig. 1, except that the frame 17 is shortened up and carries only one straight edge. The clamping device shown in Figs. 3 and 4 comprises a pair of arms 12 pivoted at 13 to the under side of the frame 5 at the ends of the straight edge 7. These arms are adapted to engage the under side of the glass sheet adjacent its edges and clamp such sheet against the lower side of the straight edge. In order to move the arms upward they are provided with a pair of screw members 14 having a relatively steep pitch, such members extending through the straight edge and having threaded upon their upper ends the nuts 15 provided with the handles 16, such handles being connected by means of the rod 17a. By swinging the rod 17a to rotate the nuts, the arms may be moved to clamped or unclamped position. When the cutter is ready to score the glass behind the straight edge 7, he moves the rod 17a so as to cause the arms 12 to clamp the sheet against the straight edge, the parts being left in this position until the sheet is scored. The rod 17a is then moved in the reverse direction to release the clamping arms. This is a more positive means for securing the cutting frame to the glass than the vacuum cups 11, and is preferred in those cases where the sheet is relatively rough on its upper side so that there is a tendency of the air to leak into the cups and thus release the connection. A variety of other means might be employed for securing the cutting frame to the glass and it will be understood that the invention contemplates broadly any and all means for releasably clamping the cutting frame to the glass during the cutting operation.

What we claim is:

1. In combination in apparatus for cutting a glass sheet, a runway for the sheet adapted to carry it forward, a cross cutting frame mounted above the glass sheet for movement longitudinally thereof and having a straight edge extending transversely of the sheet, clamping means beneath the sheet in opposition to the straight edge for securing the straight edge to the glass sheet comprising a pivoted arm carrying a threaded rod extending at right angles thereto through said frame and a nut on the rod provided with an operating handle.

2. In combination in apparatus for cutting a glass sheet, a runway for the sheet adapted to carry it forward, a cross cutting frame mounted above the glass sheet for movement longitudinally thereof and having a straight edge extending transversely of the sheet, clamping members pivoted to the frame beneath the glass sheet in opposition to the frame for swinging movement toward and from the frame and means to operate the clamping members to secure the frame to the glass sheet so that it moves therewith comprising a threaded member secured to each clamping member and extending through the frame, a nut on each member, and connecting means between the nuts for operating them in unison.

CLARENCE FREDRICK BURDETT.
WILLIAM OWEN.